UNITED STATES PATENT OFFICE.

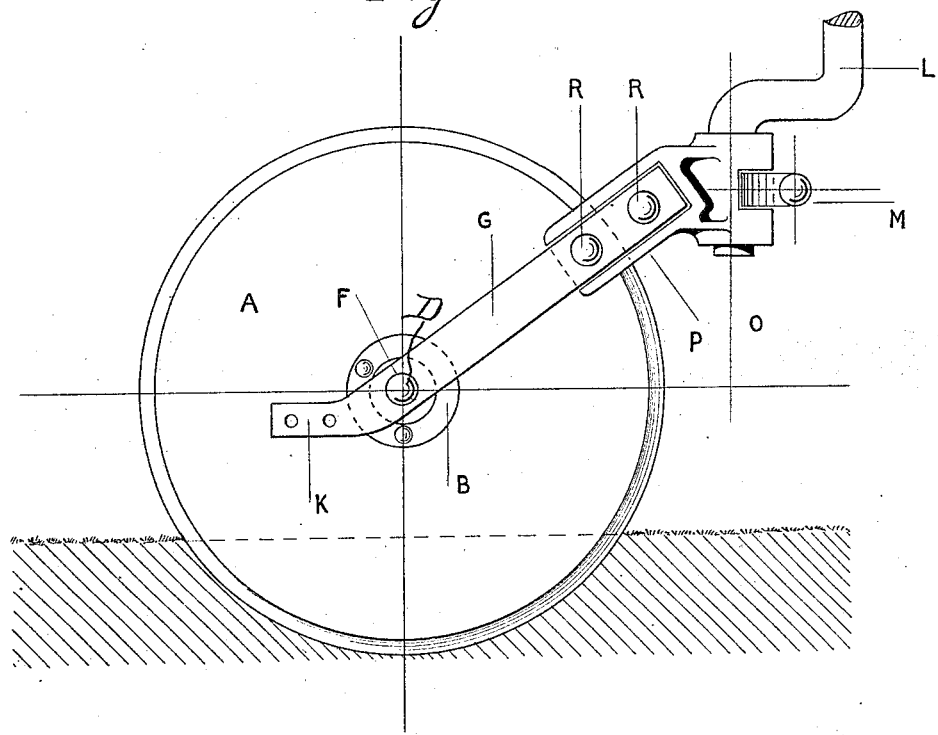

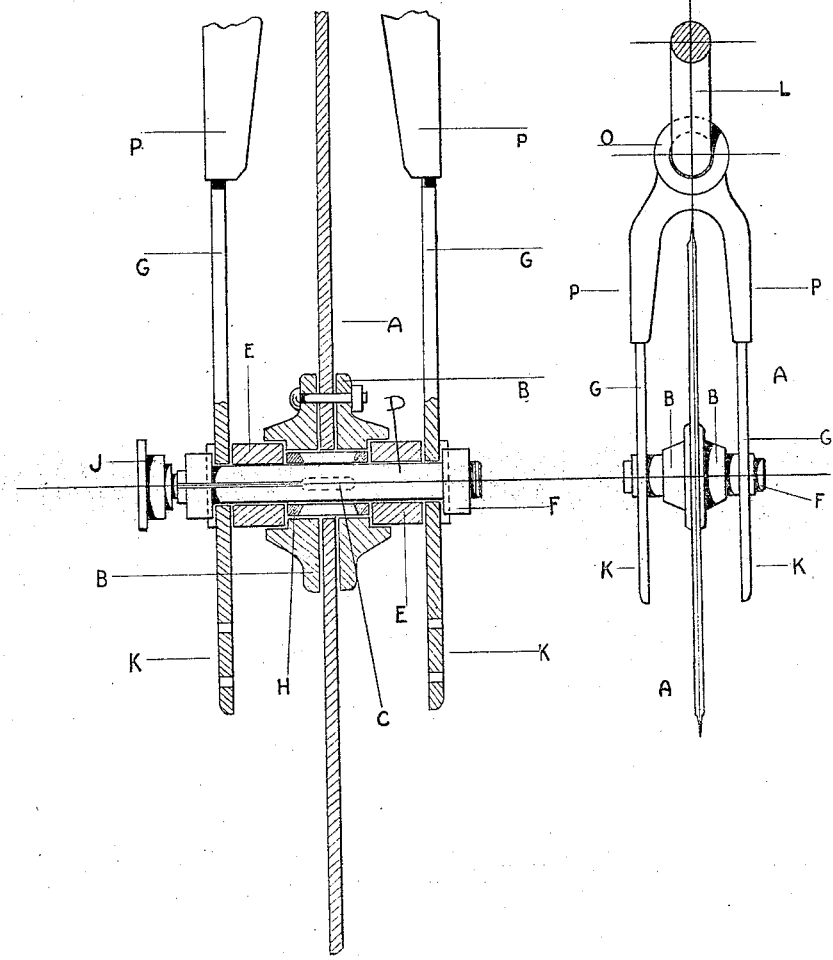

JOSÉ DELFINO, OF BUENOS AIRES, ARGENTINA.

LUBRICATING HUB FOR CIRCULAR PLOW KNIVES.

1,410,896.   Specification of Letters Patent.   Patented Mar. 28, 1922.

Application filed August 28, 1919. Serial No. 320,518.

*To all whom it may concern:*

Be it known that José Delfino, a subject of the King of Italy, residing at Buenos Aires, Argentina, has invented certain new and useful Improvements in a Lubricating Hub for Circular Plow Knives, of which the following is a specification.

This invention relates to improvements in rolling colters for plows.

One of the objects of the invention is to provide a rolling colter so mounted on its supporting means that any earth gathered by the disc of the colter and falling upon the bearing of the device, will be loosened and discharged without affecting the journal of said disc.

Another object of the present invention is to furnish a rolling colter having supporting means constructed to provide brackets to which a cleaning device or scraper for the disc may be attached.

A further object of the present invention is to provide a rolling colter with means for effectively lubricating the interior of the disc hub.

With the foregoing objects outlined and with other objects in view which will appear as the description proceeds, the invention consists in the novel features hereinafter described in detail, illustrated in the accompanying drawings and more particularly pointed out in the appended claim.

Referring to the drawings:—

Figure 1 is a side view of my improved colter and supporting mechanism.

Fig. 2 is a top plan view of the same.

Fig. 3 is a sectional view.

In the drawings, A designates the colter disc which in the present instance is connected at its central portion to a hub formed of substantially identical hub rings B each of which is provided with a conical shaped periphery, the smaller end of which is arranged at the outer end of the hub ring. This conical shape of the hub rings causes any earth carried by the disc and falling upon the hub to be guided outwardly away from the disc A.

The disc and hub rings are rotatably mounted on an axle D provided with a transverse slot C which receives lubricant from a lubricating cup J which is arranged at one end of the axle. By this construction, lubricant placed in the cup J will feed axially to the slot C and will then travel transversely through said slot to the periphery of the axle. The interior of the hub is provided with a bearing sleeve H which has slots designed to permit oil from the slot C to enter the hub and effectively lubricate said hub.

The ends of the axle D are mounted in side bars G, which have their upper ends resting in recesses in the tines P of a fork O, and bolts R secure the side bars to said tines. The fork O is provided with a socket through which the crank-shaped lower end L of the support extends and a securing member M prevents said fork from leaving the part L.

The axle D is provided with two fixed collars E which are arranged between the side bars G and the hub rings B, and the inner ends of these sleeves are located in internal annular sockets provided in the outer ends of the hub rings B. By this construction any earth falling on the hub rings B will be thrown outwardly upon the sleeves E and will fall from these sleeves to the ground. The arrangement of the conical faces of the rings B and the overlapping of the ends of the rings and the sleeves E in the manner shown and described, will effectively discharge the earth gathered by the disc A without permitting the same to enter the interior of the hub. Hence the machine or plow provided with the improved rolling colter will have a longer life than plows employing the colters now in general use, as the bearing of the present colter will remain unaffected by dampness or dirt which would be liable to enter the hub. The lower ends of the arms G are extended and apertured as shown at K in order to provide supports to which a cleaning knife or scraper for the disc may be attached.

While the preferred embodiment of the invention is illustrated in the drawing, it is apparent that various changes may be made in the construction shown without departing from the spirit of the invention as disclosed by the claim.

What I claim and desire to secure by Letters-Patent is:

A device of the kind described including a support having side bars, an axle connecting said side bars and provided with two spaced cylindrical sleeves, a member rotatably mounted on said axle and having internal shoulders which engage the inner ends of said sleeves, said member being provided with internal annular cylindrical sockets into which the inner ends of said sleeves extend, a slotted cylindrical sleeve mounted on said axle and spacing the first mentioned sleeves apart, said slotted sleeves being of less thickness than the other sleeves and forming a support for the member, and means extending through the axle for furnishing lubricant to the slotted sleeve.

In testimony whereof I affix my signature in presence of two witnesses.

JOSÉ DELFINO.

Witnesses:
 MAYER,
 S. F. CERAF.